(12) United States Patent
Taniguchi et al.

(10) Patent No.: US 7,136,241 B2
(45) Date of Patent: Nov. 14, 2006

(54) INFORMATION WRITING DEVICE

(75) Inventors: Kayoko Taniguchi, Kanagawa (JP); Akihiro Kuroda, Tokyo (JP)

(73) Assignee: Sony Corporation, Tokyo (JP)

( * ) Notice: Subject to any disclaimer, the term of this patent is extended or adjusted under 35 U.S.C. 154(b) by 166 days.

(21) Appl. No.: 10/885,064

(22) Filed: Jul. 7, 2004

(65) Prior Publication Data
US 2005/0036229 A1    Feb. 17, 2005

(30) Foreign Application Priority Data
Jul. 10, 2003    (JP)    ............................. 2003-273113

(51) Int. Cl.
*G11B 5/09*    (2006.01)
(52) U.S. Cl. .......................................... 360/51; 360/75
(58) Field of Classification Search ............... 360/75, 360/51
See application file for complete search history.

(56) References Cited

U.S. PATENT DOCUMENTS 5,442,172 A * 8/1995 Chiang et al. .......... 250/237 G
6,414,807 B1 * 7/2002 Bates et al. .................... 360/51
6,504,803 B1 * 1/2003 Matsumoto et al. ...... 369/47.53

* cited by examiner

*Primary Examiner*—William Korzuch
*Assistant Examiner*—Adam R. Giesy
(74) *Attorney, Agent, or Firm*—Oblon, Spivak, McClelland, Maier & Neustadt, P.C.

(57) ABSTRACT

An information writing device in which the information can be written accurately efficiently and in which variable formats of the disc-shaped recording mediums can be coped with without the necessity of providing master discs from one format of the disc-shaped recording medium to another. A grating interferometer clock scale system is formed by a clock pattern disc 50 having a clock track 52 carrying an optically readable clock pattern 51 and an optical head 60 for optically reading out the clock pattern 51. Clock signals are generated in a clock generator 90, to which is transmitted, via an optical fiber 80, the interference light obtained as an optical output obtained in turn by optically reading out the clock pattern 51 by the optical head 60, based on electrical signals obtained on photoelectrically transducing the optical output. The servo information synchronized with the clock signals is generated by a servo information generating part 93.

7 Claims, 5 Drawing Sheets

INFORMATION WRITING DEVICE

BACKGROUND OF THE INVENTION

1. Field of the Invention

This invention relates to an information writing device for writing the information on a disc-shaped recording medium used on being mounted on a disc driving device.

2. Description of Related Art

In a disc driving device, employing a disc-shaped recording medium, such as a hard disc, a flexible disc, an optical disc or a magneto-optical disc, a head is moved to a target track, based on the servo information written from the outset as the head positioning information on the disc-shaped recording medium, for correctly positioning the head by closed loop control.

Conventionally, a so-called servo track writer, writing the servo information on a magnetic disc, such as a hard disc or a flexible disc, is designed and constructed so that the magnetic disc is rotated at a high speed by an air spindle motor, having a high axis shake precision, the magnetic head, loaded on a head slider, is positioned on the disc from track to track by a positioner employing a high precision scale, such as a laser encoder, the servo information is written by the magnetic head and, when the servo information for one round, that is, for one complete track, is written, the head slider is radially moved along the radius of the disc a distance corresponding to one prescribed track pitch, to write the servo information for the next track, and so on, until the servo information is written in the entire track.

At this time, circumferential position detection is needed. The routine practice is to record clock signals on the disc by a separately provided magnetic head, to detect these clock signals and to re-record clock signals on the disc.

For raising the servo information write efficiency, there has also been proposed, for a servo track writer in which a plural number of discs are stacked together, and the same plural number of heads, associated with the recording surfaces of the stacked discs, are provided for writing the servo information simultaneously on the recording surfaces of the discs, a method comprising providing a master disc, on which the servo information has been written to high precision, causing the rotation of the master disc and the discs, on which the servo information is to be written, by a spindle motor, as the master disc and the discs are stacked together, and to perform head positioning control based on the servo information read out from the master disc (see, for example, Cited Reference 1). [Cited Reference 1] Japanese Patent Application Laid-Open No. 2003-162874

Meanwhile, in the method employing the master disc, having the servo information recorded thereon to high precision, it is necessary to provide a master disc, free of defects, each time the disc format is changed. Moreover, crash of the master disc may be caused in the course of the information write operation.

Moreover, the servo track writer is used in a clean room. Thus, if a magnetic clock head is used for reading out clock signals, crash of the magnetic head for clocks tends to be produced on deposition of dust and dirt on the surface of the clock head to contaminate the inside of the clean room.

Recently, with the progress in the art of recording and/or reproduction, the tendency is towards a high density recording for the recording mediums, such that the clock frequency of data recorded on the disc-shaped recording medium is becoming higher. If, in order to raise the clock signal density further, the clock frequency of the data is increased, there may be presented the problem of unneeded radiation and signal attenuation in the transmission system of the servo information.

SUMMARY OF THE INVENTION

It is therefore an object of the present invention to provide an information writing device of high universality by which the servo information can be written accurately and efficiently and which is able to cope with variable formats.

It is another object of the present invention to provide an information writing device in which there is no risk of contamination of the inside of the clean room due to head crash and in which there may be presented no problem of unneeded radiation or signal attenuation in case the clock signal frequency has become higher.

Other objects and advantages of the present invention will become more apparent from the following description of the preferred embodiment of the invention.

An information writing device according to the present invention comprises a spindle motor including a spindle shaft provided for protruding on a substrate for causing rotation of a disc-shaped recording medium detachably mounted on the spindle shaft, a clock pattern disc including a clock track in which an optically readable clock pattern is recorded along the entire circumference thereof, with the clock pattern disc being mounted on the substrate on the proximal side of the spindle shaft and being run in rotation by the spindle motor, an optical head for optically reading out the clock pattern on the substrate, a clock generator for generating clock signals based on electrical signals obtained on photoelectrically transducing a light output transmitted via an optical fiber, with the light output corresponding to the clock pattern optically read out by the optical head, an information generating part for generating the information in a timed relation to the clock signals generated by the clock generator, a recording head for writing the information generated by the information generating part on the disc-shaped recording medium, run in rotation by the spindle motor, head driving means for causing movement of the recording head in a direction along the radius of the disc-shaped recording medium, and position controlling means for controlling the head driving means based on the information generated by the information generating part for causing movement of the recording head to a preset position on the disc-shaped recording medium and positioning the recording head at the preset position.

With the information writing device, according to the present invention, a grating interferometer clock scale system is formed by a clock pattern disc having a clock track carrying an optically readable clock pattern extending along the entire circumference and an optical head for optically reading out the clock pattern. Clock signals are generated in a clock generator, to which is transmitted, via an optical fiber, the interference light obtained as an optical output obtained in turn by optically reading out the clock pattern by the optical head, based on electrical signals obtained on photoelectrically transducing the optical output. Hence, there is no fear of contamination of the inside of the clean room, ascribable to head crash, that may be produced with the use of the magnetic head. Moreover, there is presented on problem of unneeded radiation or signal attenuation in case the clock signal frequency has become higher. Since a clock disc of a large diameter, having a pattern with a large number of clocks per turn of the track, may be used, high-speed clock signals with a high resolution may be generated.

The clock generator is able to generate clock signals of an optional frequency, over a wide frequency range, by e.g. the PLL, from the interference light, obtained as the optical output corresponding to the clock pattern optically read out by the optical head.

The information of variable formats may be generated in timed relation to the clock signals, generated by the clock generator, such that variable formats may be accommodated, without providing master discs from one hard disc format to another.

In writing the servo information, as the disc-shaped recording medium is run in rotation with the air spindle motor with a long axial length, the clock pattern disc may be mounted on the proximal end on the substrate of the spindle shaft of the spindle motor, the clock pattern disc may be mounted in the vicinity of the disc-shaped recording medium on which to write the information, so that it is possible to reduce the effect of the offset ascribable to the axis shake of the spindle motor to generate clock signals susceptible to only small jitter.

In the clock generator, supplied with the interference light, corresponding to the optical output, which is the clock pattern optically read out by the optical head, the clock signals are generated on the basis of the electrical signals, obtained by photoelectrically transducing the optical output, there is presented no problem of unneeded radiations. Moreover, since there is no necessity of enclosing the photoelectric transducer, the optical head may be reduced in size. In addition, an avalanche photodetector, suffering from large power consumption and large heat evolution but having a high photoelectric transducing efficiency and superior frequency characteristics, may be used as a photoelectric transducing element.

In the clock scale system of the grating interferometer system, formed by the clock pattern disc and the optical disc, on the substrate, an air flow is produced by high speed rotation of the clock pattern disc, and changes in the refractive index caused by changes in the density of air present between the clock pattern disc and the optical head represent a detection error. However, by providing a windshield wall member, having a window closed by the light transmitting material, on the substrate, between the clock pattern disc and the optical head, arranged facing the clock pattern disc, it is possible to prohibit the effect of the air current, otherwise caused by the high speed rotation of the clock pattern disc, thus allowing generation of clock signals highly accurately.

The servo information, synchronized with the clock signals, generated by the clock generator, may be generated by the servo information generating unit and, based on this servo information, the recording head may be moved by position control means to a preset position on the recording medium, and may be positioned thereat to high accuracy, thus enabling the servo information, generated by the servo information generating unit, to be written accurately and speedily on the disc-shaped recording medium, rotationally driven at a high speed by the spindle motor.

Moreover, a pair of the optical heads are provided, the clock pattern may be read out by the paired optical heads provided at diametrically opposite positions on the clock track of the clock pattern disc, and the clock generator transduces changes in the optical outputs corresponding to the clock pattern optically read out by the paired optical discs, to form a pair of frequency signals, which are then mixed together to generate a sum frequency signal. From this sum frequency signal, clock signals may be generated, whereby the effect of the offset of the spindle shaft may be counterbalanced to generate high precision clock signals.

Thus, according to the present invention, there may be provided an information writing device of high universality in which the servo information can be written highly accurately and efficiently and in which variable formats can be accommodated without the necessity of providing master discs from one format of the disc-shaped recording medium to another.

Moreover, according to the present invention, there may be provided an information writing device in which there is no fear of contamination of the inside of the clean room due to head crash and in which there is raised no problem of unneeded radiations or signal attenuation.

DESCRIPTION OF THE PREFERRED EMBODIMENTS

Figure 1:
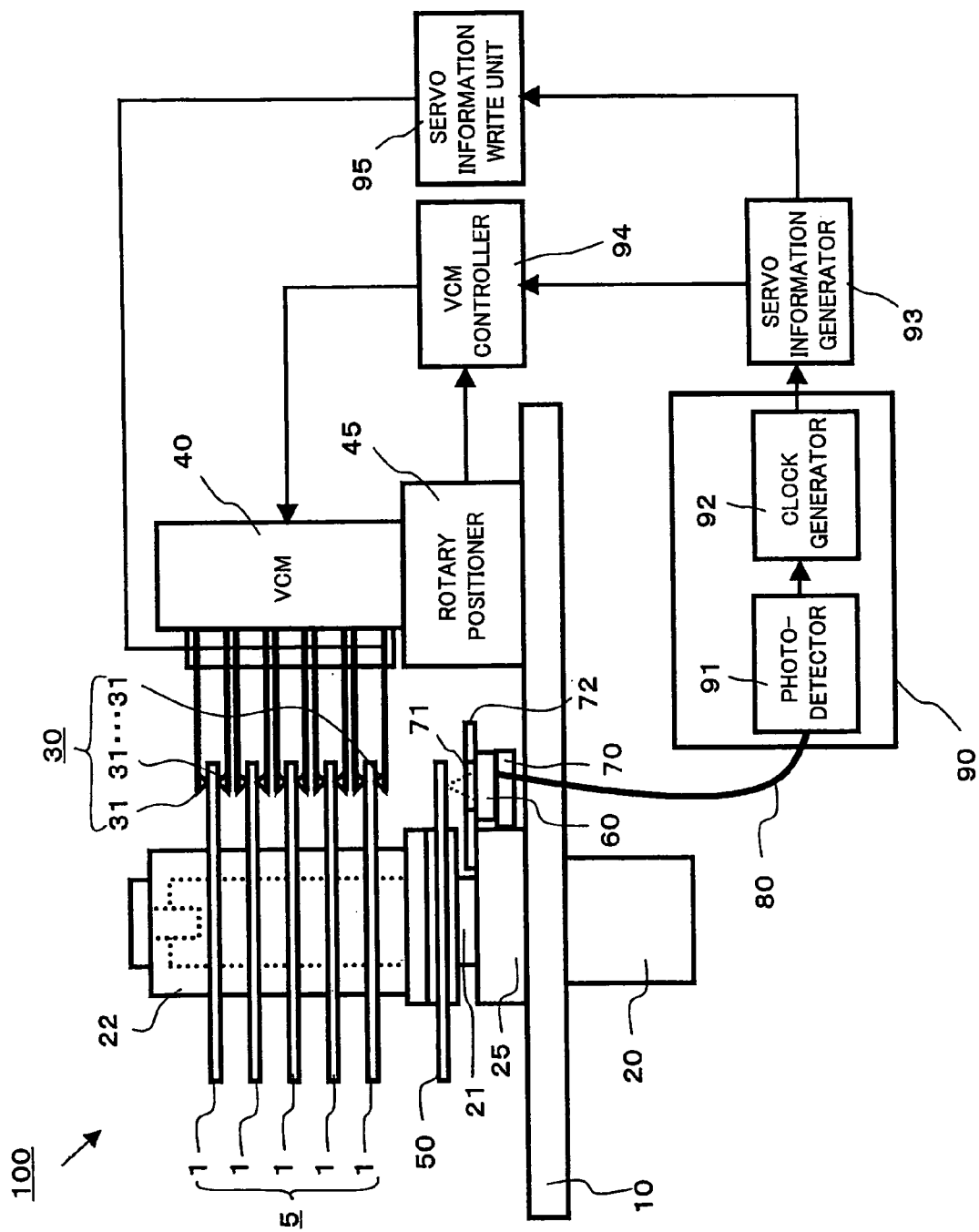
FIG. 1 is a block diagram showing the structure of a servo track writer embodying the present invention.

Referring now to the drawings, a preferred embodiment of the present invention is explained in detail.

The present invention is applied to a servo track writer 100 of a hard disc 1 configured as shown for example in FIG. 1.

This servo track writer 100 includes a substrate 10, formed e.g. of stone or metal. An air spindle motor 20 for causing rotation of the hard disc 1, detachably mounted on a spindle shaft 21, a voice coil motor 40, as a head driving means, for causing movement of a magnetic head 31 for writing the servo information on the hard disc 1, in a direction along the radius of the hard disc 1, and a rotary positioner 45, forming a position controlling means for detecting and setting the position of the magnetic head 31 along the radius of the hard disc 1.

The air spindle motor 20 is arranged so that the spindle shaft 21 thereof is protruded above the substrate 10. On this spindle shaft 21 of the air spindle motor 20, a plural number of hard discs 1 are detachably mounted as a disc stack 5 comprised of the hard discs 1 layered together by a hub 22 with a preset interval between the neighboring discs. The air spindle motor 20 causes high-speed rotation in unison of plural hard discs 1, loaded as the disc stack 5 on the spindle shaft 21.

The servo track writer 100 includes a head stack 30, comprised of a plural number of the magnetic heads 31 unified together with a preset separation between the neighboring magnetic heads 31 in association with the hard discs 1. This head stack 30 is rotationally displaced by the voice coil motor 40 for causing movement of the magnetic heads 31 in the radial direction on the recording surface of the hard disc 1.

The rotary positioner 45 is comprised of a rotary encoder, not shown, employing e.g. the laser light, for detecting the rotational angular position of the voice coil motor 40. From the rotational angular position of the voice coil motor 40, a detection output, indicating the position of the magnetic head 31 along the radius of the hard disc1 is obtained.

Figure 2:
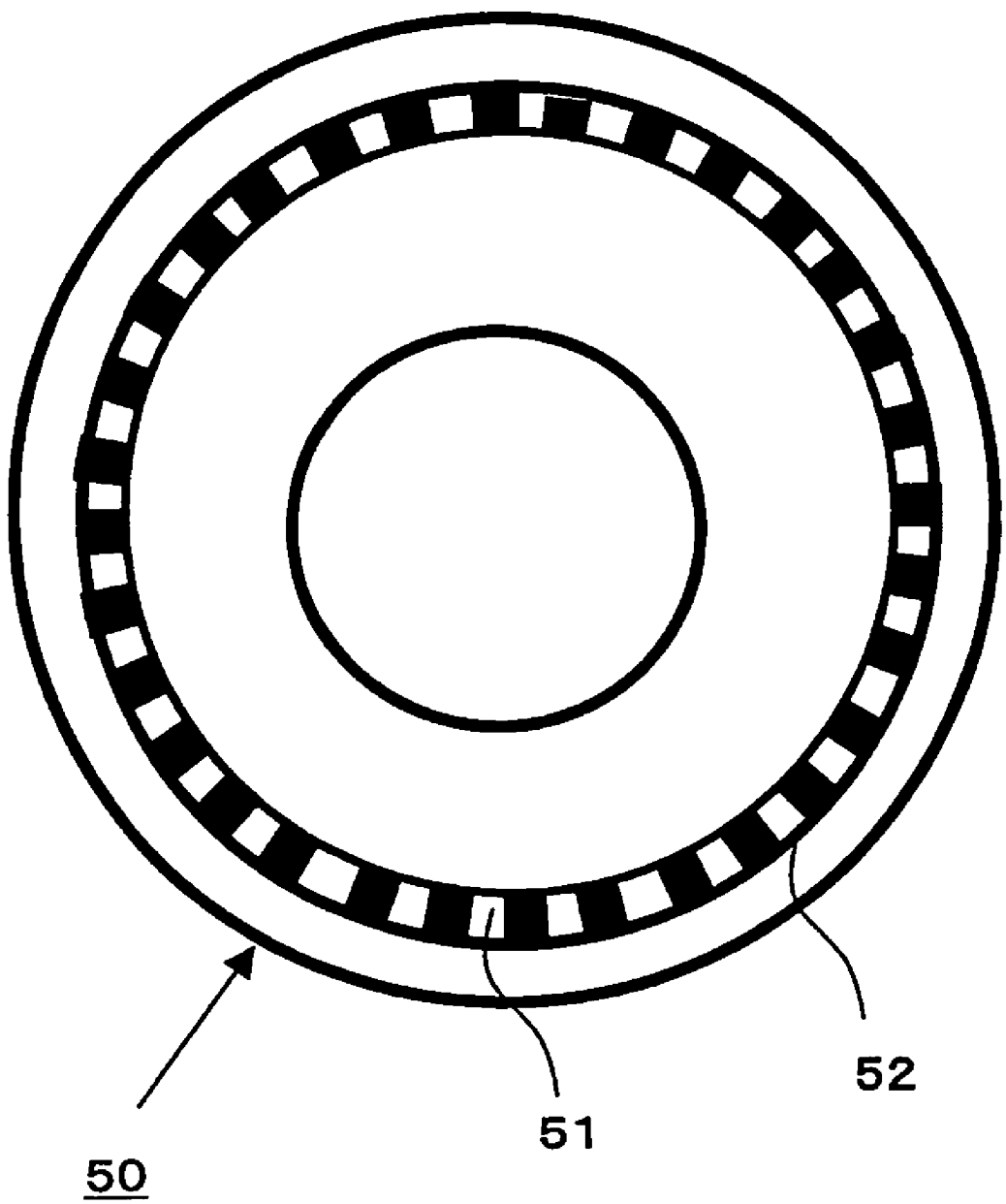
FIG. 2 is a schematic plan view of a clock pattern disc provided to the servo track writer.

A clock pattern disc 50 is mounted to the proximal portion of the spindle shaft 21 on the substrate 10 in the air spindle motor 20 of the servo track writer 100. This clock pattern disc 50 is run in rotation at a high speed along with the plural hard discs 1 mounted on the spindle shaft 21. The clock pattern disc 50 includes a clock track 52 having circumferentially recorded thereon a clock pattern 51 that may be read out optically, as shown in FIG. 2. The clock pattern 51 is comprised of a reflection type diffraction grating configured for diffracting an incident light beam.

The clock pattern disc 50 may be made detachable along with the disc stack 5.

The servo track writer 100 includes an optical head 60 for optically reading out the clock pattern 51 on the substrate 10. This optical head 60 is mounted facing a clock track 52 of the clock pattern disc 50 on the substrate 10, and is mounted on the substrate 10 or a casing 25 of the spindle motor 20 either directly or via a mounting plate 70. In the present embodiment, the optical head 60 is secured to the casing 25 of the spindle motor 20 via mounting plate 70.

In this servo track writer 100, a windshield wall member 72, having a window 71 closed with a light-transmitting material, is provided between the clock pattern disc 50 and the optical head 60.

Figure 3:
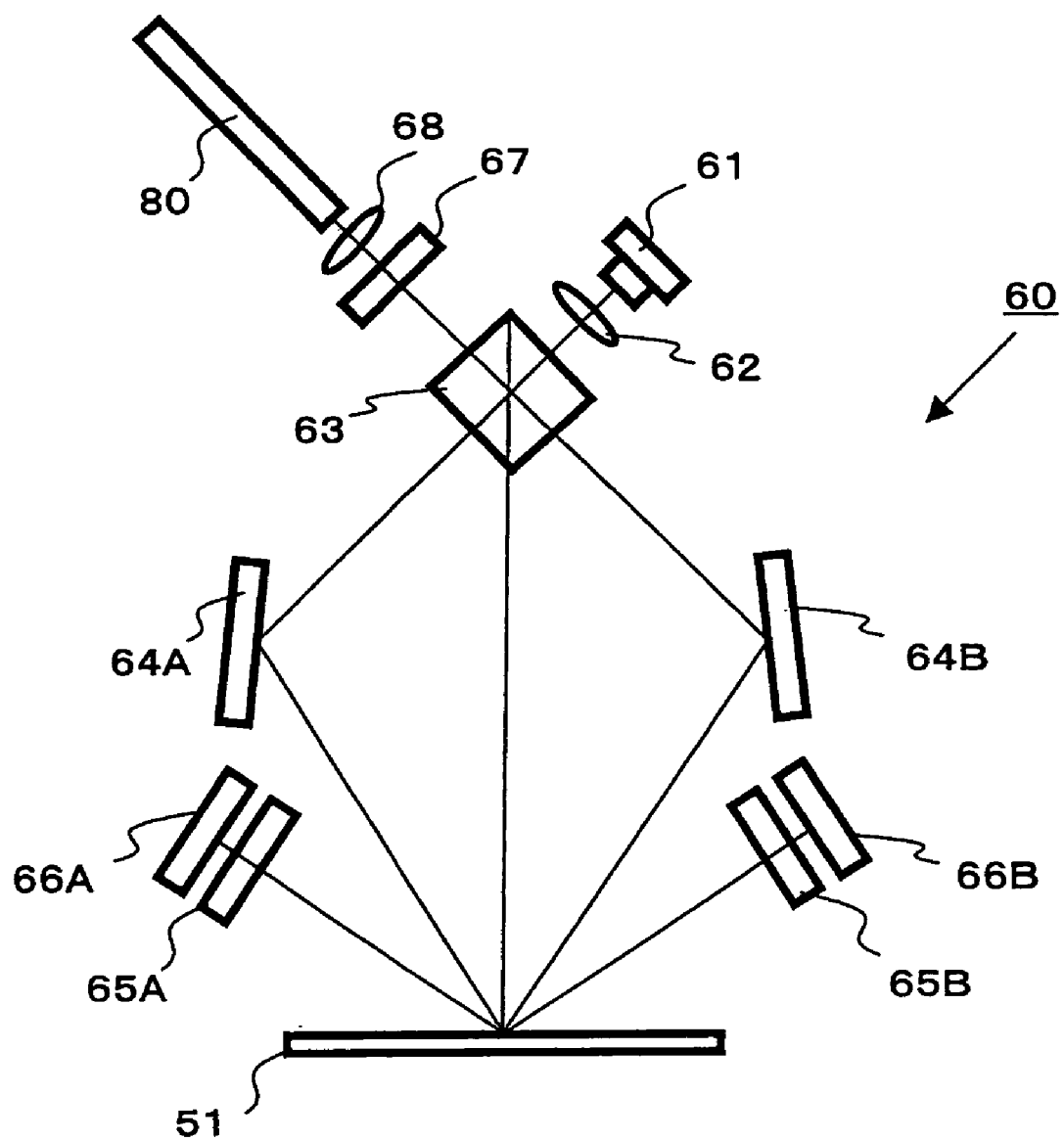
FIG. 3 is a schematic layout view of an interference optical system forming an optical head provided to the servo track writer.

The optical head 60 is formed by an interference optical system, configured as shown in FIG. 3 for detecting the intensity of interference of two order-one diffracted light beams contained in the reflected light of a light beam which is incident on and refracted by the clock pattern 51, that is, the reflection type refractive grating. Meanwhile, it is sufficient that the diffractive light, detected for the intensity of interference, is two homogeneous directed light beams, such that it may be two order-two diffracted light beams.

That is, the optical head 60 includes a polarizing beam splitter 63, on which is incident the laser beam radiated from a semiconductor laser 61 through a converging lens 62, reflective mirrors 64A, 64B, reflecting two polarized light components P and S, separated by the polarizing beam splitter 63, to cause the reflected polarized light components to fall on the clock pattern 51, that is, on the reflection type diffractive grating, and reflective mirrors 66A, 66B on which fall the reflected light beams by the reflection type diffractive grating through $\lambda/4$ plates 65A, 65B. The reflected light beams from the reflective mirrors 66A, 66B proceed along the same optical path as the ongoing optical path but in the opposite direction so as to be returned as rotated light beams to the polarizing beam splitter 63.

The light beams of respective different directions of light polarization, incident on the reflection type diffractive grating, are reflected and diffracted by the reflection type diffractive grating to become the diffracted light beams of the same sign different in the direction of light polarization. These diffracted light beams are returned as light beams, rotated in the direction of light polarization by 90° from the state of the ongoing light, by the $\lambda/4$ plates 65A, 65B and the reflective mirrors 66A, 66B, to the polarizing beam splitter 63, where the light beams are mixed together.

The return light beams, returned to the polarizing beam splitter 63, are rotated 90° in the directions of polarization thereof, so that, if the light beams are radiated in a direction at right angles to the light incident direction on the ongoing optical path and the polarized light components of the same direction are taken out by the light polarizing plate 67, light interference is produced. The interference light falls on an optical fiber 80 through converging lens 68.

If the wavelength $\lambda$, amplitude E and the vector of the number of light waves of the incident light k are related with one another by $$E = 2e^{i(kr+wt)}$$

$$k = 2\pi\lambda,$$

the wavelength of the grating $\Lambda$, transmittance T and the vector of the grating K of the reflection type diffractive grating are such that transmittance T=1+cos(Kx)

vector of the grating $K = 2\pi/\Lambda$, the two order-one diffracted light beams E1, E1' by the reflection type diffractive grating are represented by $$E1 = e^{i(kr+wt+Kx)}$$

$$E1' = e^{i(kr+wt-Kx)}$$

while the intensity I of the interfering light of the two order-one diffracted light beams E1, E1' is given by $$I = (E1' + E1)(E1' + E1)^*$$
$$= 2 + 2\cos(2Kx + \Phi)$$

where $\Phi$ is a constant phase term. If the interference light intensity I is observed, one sine wave signal is obtained for the distance of movement equal to ½ of the grating wavelength $\Lambda$ of the reflection type diffractive grating.

In the interference optical system, employed in the optical head 60 in this servo track writer 100, since the diffraction occurs twice by the reflection type diffractive grating, that is, once on the ongoing path and on the return path, one sine wave signal is obtained for the distance of movement equal to one-fourth of the grating wavelength $\Lambda$ of the reflection type diffractive grating.

As the semiconductor laser 61, the type of the laser in which the longitudinal mode is the multimode and the distance of coherence is short, or the laser type in which the longitudinal mode is inherently a single mode but is turned into a multi-mode by high frequency modulation of the driving current (referred to below as high frequency driving), may be used. In case the semiconductor laser, in which the longitudinal mode is the single mode, is used, skipping of the interference signals or noise generation due to mode whip tends to be produced. Such problem is not raised with the multi-mode semiconductor laser because no mode whip is produced. With the single-mode semiconductor laser, with a long distance of coherence, the noise tends to be produced in the interference signal due to interference of the light subjected to multiple reflection. With the multi-mode semiconductor laser, no such problem is raised because of the short distance of coherence. On the other hand, as disclosed in the Japanese Laid-Open Patent Publication 61-83911, if there is a difference in the optical path lengths of two light beams, interfering with each other, an error E such that $$E = \Delta\lambda/\lambda \cdot 2 \cdot \Delta L \cdot \Lambda/4$$

where $\lambda$ denotes the wavelength of the light source, $\Delta L$ denotes the difference of the optical path lengths, $\Delta\lambda$ is the wavelength variation and $\Lambda$ is produced. If the distance of coherence is short, the difference of the optical path lengths ΔL of the two light beams, interfering with each other, may be reduced, and hence the error generation in the clock signal caused by laser wavelength variation may be diminished. If the semiconductor laser in which the single mode type of the longitudinal mode is turned into a multi-mode by high frequency driving, the above-described merits may be derived. In this case, the light beam is in the intensity modulated form, and hence the frequency of high pulsation or high frequency driving is desirably not less than twice the frequency of the interference signal obtained on disc rotation. The superposed signal needs to be removed by a low-pass filter after photoelectrically transducing the interference signal.

The servo track writer 100 also includes a clock generator 90, to which an optical output corresponding to the clock pattern 51 optically read out by the optical head 60 is transmitted over the optical fiber 80, a servo information generator 93, supplied with the clock signals generated by the clock generator 90, a VCM controller 94, and a servo information write unit 95, supplied with the servo information generated by the servo information generator 93.

The clock generator 90 transduces changes in the interference intensity of the optical output, supplied from the optical head 60 through the optical fiber 80, by a photodetector 91, into electrical signals, serving as frequency signals, based on which clock signals are generated by a clock generator 92. As the photodetector 91, an avalanche photodetector is used. The clock generator 92 is able to generate clock signals of an optional frequency based on electrical signals obtained on photoelectrically tranducing the optical output by the photodetector 91.

The servo information generator 93 generates the servo information in timed relation to the clock signals generated by the clock generator 90.

The VCM controller 94 is supplied from the rotary positioner 45 with a detection output, indicating the position of the magnetic head 31, along the radial direction of the hard disc 1, and controls the voice coil motor 40, based on the detection output, indicating the position of the magnetic head 31, and on the servo information generated by the servo information generator 93, to cause movement of the magnetic head 31 to a track position on the hard disc 1 for writing the servo information by the magnetic head 31, that is, to a preset position along the radial direction of the hard disc 1.

The servo information write unit 95 sends the servo information, generated by the servo information generator 93, as a recording signal to each magnetic head 31, for writing the so generated servo information on each hard disc.

In the above-described servo track writer 100, in which no magnetic head is used, there is no fear of contamination of the inside of the clean room otherwise caused by head crash. Moreover, since the clock signals are transmitted as optical signals, using the optical fiber 80, there is no fear of raising the problem of unneeded radiations or signal attenuation, such that the clock pattern disc 50 of a larger diameter, having a clock pattern composed of a large number of clocks per turn, thus enabling the generation of high resolution high speed clocks.

Additionally, with the clock generator 90, it is possible to generate clock signal of an optional frequency, over a wide frequency range, by e.g. the PLL, from the interference light obtained as a light output corresponding to the aforementioned clock pattern 51 optically read out by the optical head 60.

Furthermore, the clock pattern disc 50 of a larger diameter may be used, so that, when the hard disc 1 is run in rotation by the air spindle motor 20 of a larger axial length, the clock pattern disc 50 may be mounted on the substrate 10 in the vicinity of the hard disc 1, on which to write the servo information, by mounting the clock pattern disc 50 on the proximal end of the spindle shaft 21 of the air spindle motor 20, thereby reducing the effect of the offset caused by axis shake of the spindle motor 20 to a minimum to enable generation of clock signals with reduced jitter.

Since the interference light, obtained as an optical output, corresponding to the clock pattern 51 optically read out by the optical head 60, is transmitted through the optical fiber 80, there is raised no problem of, for example, unneeded radiations. Moreover, since there is no necessity for enclosing the photoelectric transducer, the optical head 60 may be reduced in size. On the other hand, a photoelectric transducer, such as an avalanche photodetector, suffering from large power consumption and large heat evolution but having a high photoelectric transducing efficiency and superior frequency characteristics, may be used as the photodetector 91.

In the clock scale system of the grating interferometer system, formed by the clock pattern disc 50 and the optical disc 60, on the substrate 10, an air flow is produced by high speed rotation of the clock pattern disc 50, changes in the refractive index by the changes in the density of air present between the clock pattern disc 50 and the optical head 60 represent a detection error. However, by providing a windshield wall member 72, having a window 71 closed by the light transmitting material, on the substrate, between the clock pattern disc 50 and the optical head 60, arranged facing the clock pattern disc 50, it is possible to prohibit the effect of the air current caused by the high speed rotation of the clock pattern disc 50 to generate clock signals highly accurately.

Meanwhile, in case the diffraction grating is of the transmitting type, it is preferred to provide a windshield wall member 72 having a window 71 on each surface of the clock pattern disc 50. For further reducing the effect of the air flow, the side of the window 71 facing the clock pattern disc 50 is preferably flush with the windshield wall member 72. This windshield wall member 72 is preferably formed along the entire circumference of the clock pattern disc 50. In case the diffraction grating is of the transmitting type, the windshield wall member 72 preferably overlies the clock pattern disc 50. Although the separation between the windshield wall member 72 and the clock pattern disc 50 may approximately be 20 mm or less, it is preferably 10 mm or less if the signals of the optical system are taken into account.

The servo information, synchronized with the clock signals, generated by the clock generator 90, may be generated by the servo information generator 93 and, by controlling the voice coil motor 40, by the VCM controller 94, based on this servo information, the recording head 31 may be moved to a preset position on the recording medium and positioned to high accuracy, thus enabling the accurate and quick writing of the servo information, generated by the servo information generator 93, on the hard disc 1, rotationally driven at a high speed by the spindle motor 20.

Figure 4:
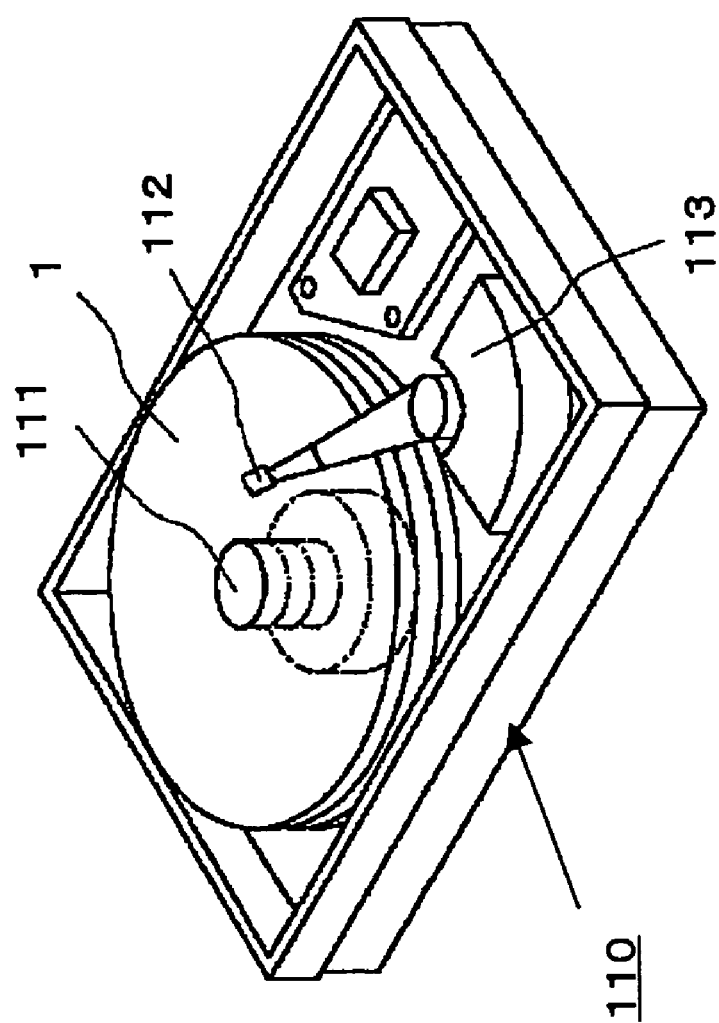
FIG. 4 is a perspective view showing the structure of a hard disc drive carrying a hard disc on which the servo information has been written by the servo track writer.

The hard disc 1, on which has been written the servo information by the servo track writer 100, is loaded on a hard disc drive 110 configured as shown for example in FIG. 4. With this hard disc drive 110, the hard disc 1 is run in rotation by a spindle motor 111, and the information is recorded and/or reproduced by a magnetic head 112. The magnetic head 112 is moved radially of the hard disc 1 by a voice coil motor 113.

With the above-described servo track writer 100, the clock pattern 51 on the clock track 52 of the clock pattern disc 50 is read out and clock signals are generated by the clock generator 90. Alternatively, the clock pattern 51 on the clock track 52 of the clock pattern disc 50 may be read out by a pair of optical heads 60A, 60B, to generate clock signals by the clock generator 90, as in a servo track writer 200 shown in FIG. 5.

Figure 5:
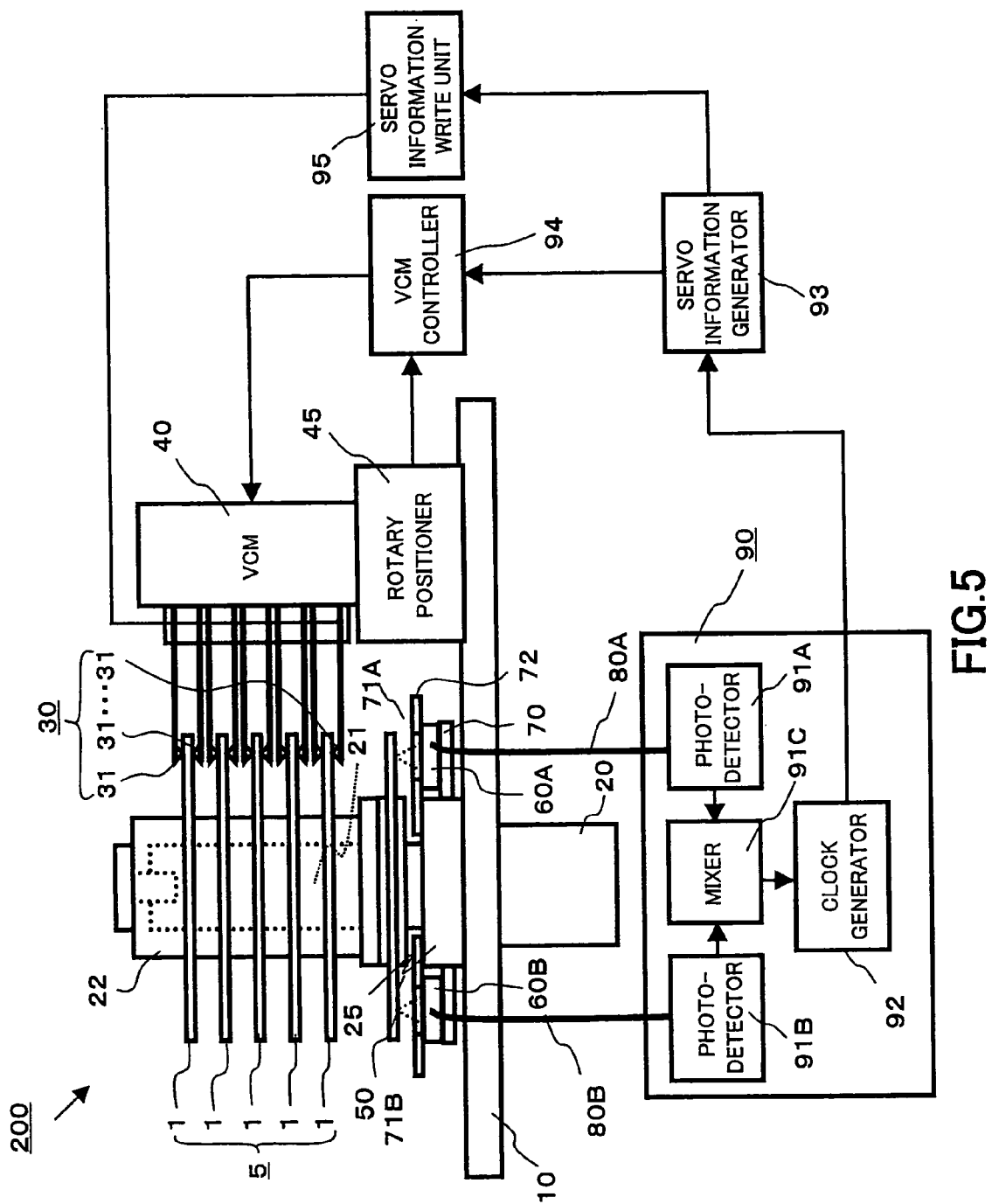
FIG. 5 is a block diagram showing the structure of the servo track writer adapted for reading out a clock pattern on a clock track of a clock pattern disc by a pair of optical heads and for generating clock signals by a clock generator.

Meanwhile, in the servo track writer 200, shown in FIG. 5, the parts or components which are the same as those of the servo track writer 100 shown in FIG. 1 are indicated by the same reference numerals, and the detailed description thereof is omitted for simplicity.

In the servo track writer 200, shown in FIG. 5, a pair of optical heads 60A, 60B are mounted at diametrically opposite positions on the clock track 52 of the clock pattern disc 50, for reading out the clock pattern 51 via windows 71A, 71B of the windshield wall member 72. The clock pattern 51 is optically read out at the diametrically opposite positions on the clock track 52 by the paired optical heads 60A, 60B to generate optical outputs which are transmitted via optical fibers 80A, 80B so as to be incident on the clock generator 90. A pair of photoconductors 91A, 91B of the clock generator 90 operate for transducing changes in the optical outputs corresponding to the clock pattern 51 optically read out by the paired optical heads 60A, 60B, into electrical signals to form a pair of frequency signals, which are then mixed together by a mixer 91C to generate a sum frequency signal. From this sum frequency signal, clock signals are generated by a clock generating circuit 92 to generate clock signals.

In this manner, the clock pattern 51 is read out at diametrically opposite positions on the clock track 52 of the clock pattern disc 50. The clock generator 90 operate for transducing changes in the optical output, optically read out by the paired optical heads 60A, 60B, into electrical signals to form a pair of frequency signals, which are then mixed together to form a sum frequency signal, From this sum frequency signal, clock signals are generated, whereby the effect of the offset of the spindle shaft 21 may be counterbalanced to generate high precision clock signals.

Although the present invention has been applied to the servo track writer 100, adapted for writing the servo information on the hard disc 1, the present invention may also be applied to a cutting device adapted for producing a master disc of an optical disc or a magneto-optical disc.

Although a reflection type diffractive grating is referred to in the explanation of the above-described embodiment, a transmission type diffractive grating may also be used.

Although the above-described embodiment refers to the servo track writer 100, configured for writing the servo information on the hard disc 1, data as information may also be written on the disc-shaped recording medium.

What is claimed is:

1. An information writing device, comprising:
    a spindle motor including a spindle shaft provided for protruding on a substrate for causing rotation of a disc-shaped recording medium detachably mounted on the spindle shaft;
    a clock pattern disc including a clock track in which an optically readable clock pattern is recorded along the entire circumference thereof, said clock pattern disc being mounted on said substrate on the proximal side of said spindle shaft opposite said recording medium and being run in rotation by said spindle motor;
    an optical head for optically reading out said clock pattern on said clock pattern disc;
    a clock generator for generating clock signals based on electrical signals obtained on photoelectrically transducing a light output transmitted via an optical fiber, said light output corresponding to said clock pattern optically read out by said optical head;
    an information generating part for generating the information in a timed relation to the clock signals generated by said clock generator;
    a recording head for writing the information generated by said information generating part on said disc-shaped recording medium, run in rotation by said spindle motor;
    head driving means for causing movement of said recording head in a direction along the radius of said disc-shaped recording medium; and
    position controlling means for controlling said head driving means based on the information generated by said information generating part for causing movement of said recording head to a preset position on said disc-shaped recording medium and positioning said recording head at said preset position.

2. The information writing device according to claim 1, wherein
    said clock pattern is a diffraction grating for diffracting an incident light beam;
    said optical head being formed by an interference optical system for detecting the intensity of interference of two homogeneous diffracted light beams contained in a diffracted light beam which is a light beam incident on and diffracted by said diffraction grating;
    said clock generator transducing changes in the intensity of interference of a light output, transmitted from said optical head through said optical fiber, into electrical signals, and generating the clock signals based on the generated electrical signals.

3. The information writing device according to claim 2, wherein said clock pattern is a reflection type diffractive grating for diffracting the incident light beam.

4. The information writing device according to claim 1 or 2, wherein a self-pulsation type semiconductor laser or a high-frequency-driven semiconductor laser is used as a light source of said light beam, the self-pulsation frequency or the frequency for high frequency driving is set so as to be higher than the frequency of an interference signal produced on rotation of said clock pattern disc, and wherein clock signals are generated based on a signal obtained on photoelectrically transducing said interference signal and removing modulation components by self-pulsation or high frequency driving by a low-pass filter from the resulting transduced signal.

5. The information writing device according to claim 1 or 2, wherein a windshield wall member having a window closed by a light transmitting material is provided on said substrate between the clock pattern disc and said optical head arranged facing said clock pattern disc.

6. The information writing device according to claim 1 or 2, wherein said clock generator transduces changes in the interference intensity of the light output transmitted from said optical head through said optical fiber into electrical signals by an avalanche photodetector.

7. The information writing device according to claim 1 or 2, wherein
    a pair of said optical heads are provided, a clock pattern is read out by said paired optical heads at diametrically opposite positions on the clock track of said clock pattern disc; and wherein
    said clock generator transduces changes in optical outputs, obtained on optically reading out said clock pattern by said paired optical heads, into respective electrical signals, to produce a pair of frequency signals, these paired frequency signals are mixed together to give a sum frequency signal, and clock signals are generated from the sum frequency signal.

* * * * *